United States Patent
Rishi et al.

(10) Patent No.: US 12,153,561 B2
(45) Date of Patent: Nov. 26, 2024

(54) ITEM NAME SUGGEST

(71) Applicant: Mercari, Inc., Palo Alto, CA (US)

(72) Inventors: Sahil Rishi, San Jose, CA (US);
Manikandan Sankar, Hayward, CA (US); Byong Mok Oh, Los Altos, CA (US); Yodhavee Chuenbunluesook, Bangkok (TH); Ankit Kumar Baruah, Berlin (DE); Shuichi Iida, San Mateo, CA (US)

(73) Assignee: MERCARI, INC., Palo Alto, CA (US)

( * ) Notice: Subject to any disclaimer, the term of this patent is extended or adjusted under 35 U.S.C. 154(b) by 7 days.

(21) Appl. No.: 17/302,580

(22) Filed: May 6, 2021

(65) Prior Publication Data
US 2021/0357382 A1 Nov. 18, 2021

Related U.S. Application Data

(60) Provisional application No. 63/023,293, filed on May 12, 2020.

(51) Int. Cl.
*G06F 16/23* (2019.01)
*G06F 7/02* (2006.01)

(52) U.S. Cl.
CPC .............. *G06F 16/23* (2019.01); *G06F 7/026* (2013.01)

(58) Field of Classification Search
CPC ...... G06F 16/951; G06F 16/58; G06F 16/958; G06F 16/954; G06F 3/0482; G06F 16/9538; G06F 16/248; G06F 16/24578
See application file for complete search history.

(56) References Cited

U.S. PATENT DOCUMENTS

| | | | |
|---|---|---|---|
| 7,778,874 B1 | 8/2010 | Saunders | |
| 8,086,504 B1 * | 12/2011 | Dicker | G06Q 30/0641 707/750 |
| 9,245,271 B1 * | 1/2016 | Ahmed | G06Q 30/00 |
| 9,501,551 B1 | 11/2016 | Weissgerber et al. | |
| 2003/0204447 A1 | 10/2003 | Dalzell et al. | |

(Continued)

OTHER PUBLICATIONS

International Search Report and Written Opinion from International Application No. PCT/US2021/031547, dated Jul. 27, 2021 (28 pages).

*Primary Examiner* — Hau H Hoang
(74) *Attorney, Agent, or Firm* — Sterne, Kessler, Goldstein & Fox P.L.L.C.

(57) ABSTRACT

Described herein are embodiments for assisting in creating a listing for a For Sale Object (FSO). An item name suggestion module receives seller input and provides suggested entries for the listing to help the seller describe the FSO more accurately and consistently. A hierarchical database provides a structure for ordering suggested entries, with the structure ordered based on scores. The scores are based on rules that relate item characteristics and take into account rankings of those item characteristics with respect to one another. Metadata tags that are used by the online merchandise platforms can be identified and included in the listing, even if a seller is not familiar with the metadata tags. The hierarchical database also connects or associates item characteristics in groups that describe specific FSO. The connections can help to optimize search results as the listing is completed by the seller.

20 Claims, 7 Drawing Sheets (56) References Cited

U.S. PATENT DOCUMENTS

| | | | |
|---|---|---|---|
| 2009/0171930 A1* | 7/2009 | Vaughan | G06F 16/955 |
| | | | 707/999.005 |
| 2010/0082452 A1* | 4/2010 | Speers | G06Q 30/0603 |
| | | | 705/26.1 |
| 2013/0297581 A1 | 11/2013 | Ghosh et al. | |
| 2016/0358096 A1* | 12/2016 | Bannur | G06F 16/7867 |
| 2018/0268454 A1 | 9/2018 | Johnson et al. | |
| 2020/0104869 A1 | 4/2020 | Oh et al. | |

* cited by examiner

ITEM NAME SUGGEST

TECHNICAL FIELD

This disclosure relates generally to optimizing search engine results based on scored entries in a hierarchical database.

BACKGROUND

Ecommerce web sites and applications for selling items over the internet provide an enormous market for consumers to resell goods. However, the large size of the market can force sellers to spend a great deal of effort to create listings for items they are selling. In a consumer-to-consumer (C2C) marketplace, sellers may not always know accurate or proper descriptions of the items they wish to sell. And item labels specific to a web site or application, such as metadata tags, are typically unknown to the average seller. Simple aids to present results as they are found or to try to guide a seller through the listing process can be overwhelming and, in some instances, can render a web site or application unwieldly or nearly useless. This problem is exacerbated when a seller is trying to create a listing on a mobile device, as the small screen and restricted interface make it more difficult to navigate a listing creation tool.

BRIEF SUMMARY

Provided herein are system, apparatus, article of manufacture, method and/or computer program product embodiments, and/or combinations and sub-combinations thereof, for providing ordered search results based on user inputs and a hierarchical database to aid in the creation of listings of "for sale objects" (FSO) on an ecommerce site.

Some embodiments operate by: receiving a character sequence comprising at least one character; identifying a subset of item characteristics of a plurality of item characteristics based on the character sequence, wherein each item characteristic of the plurality of item characteristics comprises a string, and each item characteristic being associated with at least one other item characteristic and a score, and wherein the score describes a ranking of the each item characteristic relative to each other item characteristic of the plurality of item characteristics; selecting one or more item characteristics from the subset of item characteristics based on a comparison of the score for each item characteristic of the subset of item characteristics; and providing the one or more item characteristics to a device.

Further embodiments, features, and advantages of the present disclosure, as well as the structure and operation of the various embodiments of the present disclosure, are described in detail below with reference to the accompanying drawings.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, and computer program product embodiments, and combinations and sub-combinations thereof, for providing ordered search results based on user inputs and a hierarchical database to aid in the creation of listings of "for sale objects" (FSO) on an ecommerce site.

FSOs may be any item, product, object, article, thing, piece, component, sub-component, combination, merchandise, inventory, and/or service that a user wishes to sell on an ecommerce site. FSOs may be posted for sale to the ecommerce site using an item listing. A user posting an item listing to the ecommerce is sometimes called a "seller." A user seeking to buy items on an ecommerce site is sometimes called a "buyer."

Figure 1:
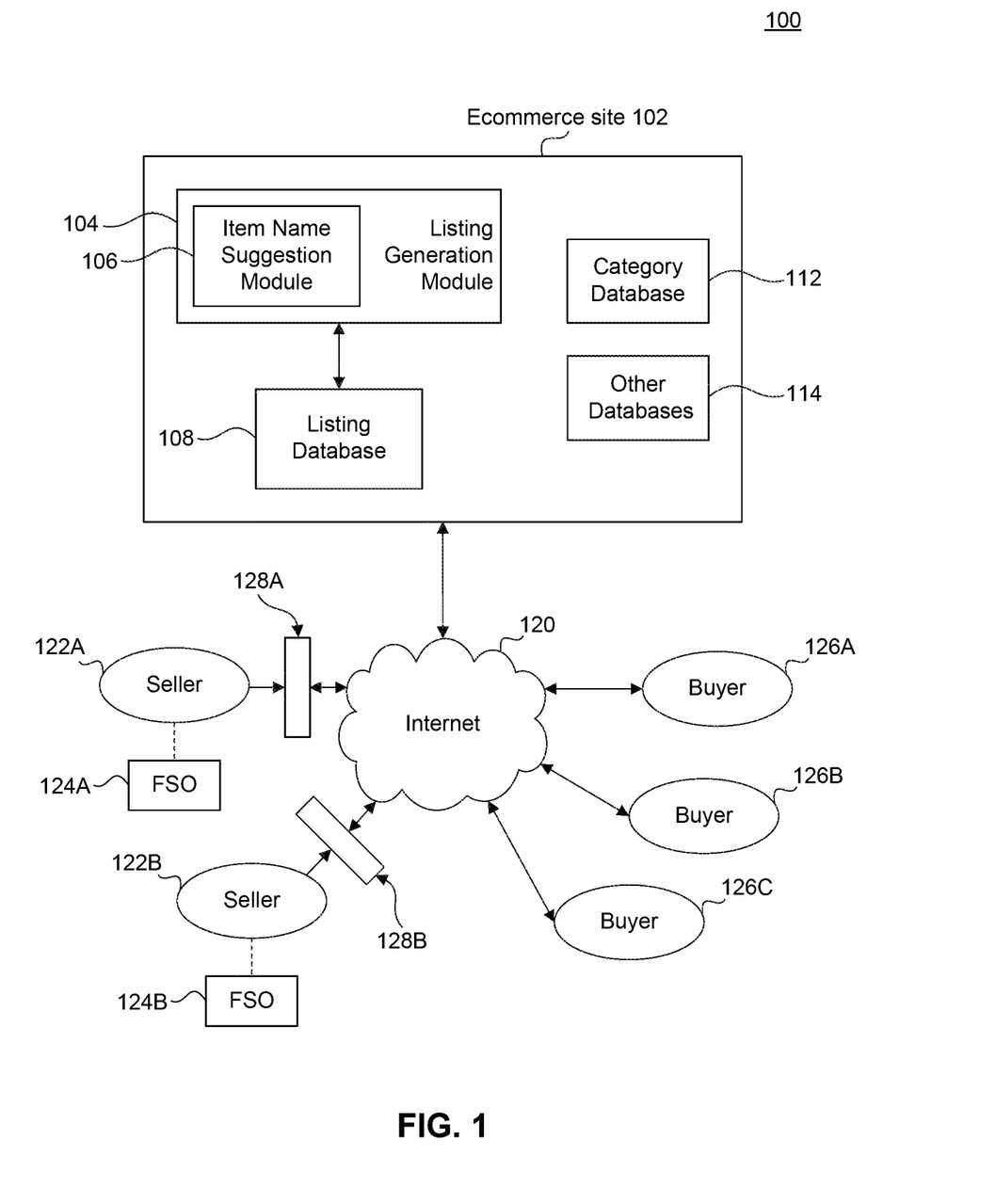
FIG. 1 illustrates a block diagram of a computing environment that includes an ecommerce site where users can buy and sell items and severs, including a module for providing item name suggestions based on user input, according to some embodiments.

FIG. 1 illustrates a block diagram of a computing environment 100 that includes an ecommerce site 102 where sellers 122 can sell their FSOs 124, and buyers 126 can browse, search, and buy the FSOs 124, according to some embodiments. The sellers 122 and buyers 126 can access the ecommerce site 102 via the Internet 120 or any other network or communication medium, standard, protocol, or technology. A seller 122 may access the ecommerce site 102 using a device 128 configured to access the Internet 120.

The ecommerce site 102 may include a listing database 108 that stores listings of FSOs 124. Sellers 122 may create the listings to sell their respective FSOs 124. Traditionally, sellers 122 were required to create their listings manually. Particularly but not exclusively in a consumer-to-consumer (C2C) marketplace, sellers 122 often create inconsistent listings based on their own descriptions of the FSOs 124. This can make it more difficult for a seller 122 to sell an FSO 124, as buyers 126 may search for the FSO 124 under a different description. Ecommerce sites 102 may use predetermined metadata tags to help buyers 126 find the desired FSOs 124, but sellers 122 may not know the metadata tags to use or even be aware of their existence.

But according to this disclosure, sellers 122 may interact with a listing generation module 104, which includes an item name suggestion module 106 that helps the sellers 122 create a listing for an FSO 124 by suggesting descriptions and metadata tags based on a hierarchical database 112.

The listing generation module 104 may provide other services to assist a seller 122 in creating a listing, and the ecommerce site 102 and listing generation module 104 may contain and use other databases 114, according to some embodiments.

The hierarchical database 112 contains sets of item characteristics that describe FSOs 124. Some of the item characteristics are associated with the metadata tags used by the ecommerce site 102.

Each item characteristic is also associated with a score that identifies a ranking of the item characteristic relative to other item characteristics. The scores may be set by rules to reflect the relative ranking. Ranking may reflect popularity of a particular FSO 124 or item feature of the FSO 124.

Ranking may also reflect the importance or utility in identifying an FSO 124, including eliminating the most possible other FSOs 124 from search results. For example, a category of an FSO 124 may have a high ranking, as it immediately narrows results to similar FSOs 124. As a further example, a color of an FSO 124 may have a low ranking because it can apply to any FSO 124 which has that color, even if the FSOs 124 are otherwise dissimilar.

The hierarchical database 112 may also contain levels of ranking Each level represents item characteristics of similar ranking A level may contain groups of item characteristics of a similar type that each describe FSOs 124, such as a category, a manufacturer, a model, a color, a storage size, or other item characteristics used to describe FSOs 124.

By using the item name suggestion module 106, sellers 122 can enter descriptions or partial descriptions of an FSO 124 into the devices 128 and the item name suggestion module 106 can search the hierarchical database 112 to identify matching item characteristics. The item name suggestion module 106 can then use the scores to order the results and provide the most relevant search results or item names to the sellers 122. The item name suggestion module 106 may also limit the number of results provided to simplify the seller's 122 choices and make the results easier to parse, especially on mobile devices with limited screen space.

Once a seller 122 selects a suggested item description term, the item name suggestion module 106 may also provide associated metadata tags automatically. The combination of the metadata tags and the suggested item description can aid the seller 122 in creating a listing for the FSO 124 that is easier for a buyer 126 to find. Further, buyers 126 will be more likely to find all listings of similar FSOs 124, as they will have similar item names and metadata.

In some embodiments, the item name suggestion module 106 also utilizes relationships between the item characteristics based on the FSOs 124 that the item characteristics describe to narrow search results. For example, as item characteristics are selected by sellers 122, only item characteristics associated with the selected item characteristics will remain relevant. Further, in some cases, some item characteristics may become fixed based on other selections by the sellers 122, as they may be the item characteristics that describe the FSOs 124 that remain options based on the previous selections. The item name suggestion module 106 may automatically fill in item listing entries that are fixed in this way, saving sellers 122 the time of having to search for or enter these item characteristics.

Once the sellers 122 have completed the item listing with the aid of the item name suggestion module 106, the listing generation module 104 may provide other services to aid the sellers 122 in completing a listing for the FSOs 124, including using other databases 114 as necessary.

Figure 2:
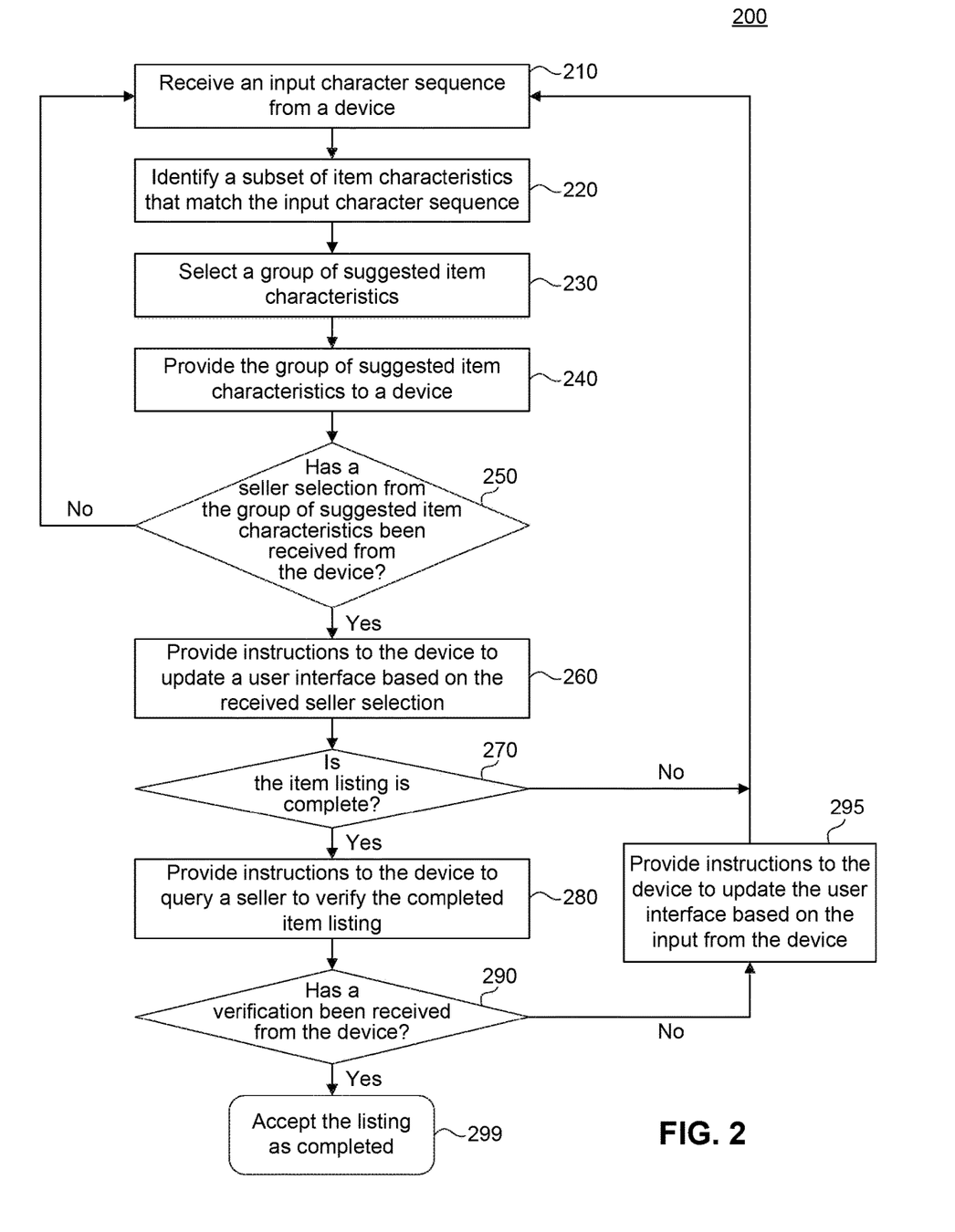
FIG. 2 is a flowchart illustrating a method for identifying item characteristics based on received inputs from a device, according to some embodiments.

FIG. 2 is a flowchart illustrating a method 200 for identifying item characteristics based on user or seller 122 input, according to some embodiments. Method 200 may be performed by processing logic that may include hardware (e.g., circuitry, dedicated logic, programmable logic, microcode, etc.), software (e.g., instructions executing on a processing device), or a combination thereof. The steps of method 200 may be performed by the item name suggestion module 106, described above. A subset of steps of method 200 may be sufficient in order to perform the enhanced techniques disclosed herein. Further, some steps of method 200 may be performed simultaneously, or in a different order from that shown in FIG. 2, as will be understood by a person of ordinary skill in the art.

In some embodiments, method 200 is performed by the item name suggestion module 106 within an ecommerce site 102. The ecommerce site 102 may already be configured to take inputs or receive information. Thus, the steps below that receive information may be handled by the input of the ecommerce site 102 and passed to the item name suggestion module 106. Further, steps below that provide or output information may provide that information to ecommerce site 102.

In 210, the item name suggestion module 106 may receive an input character sequence from a device 128. The item name suggestion module 106 may receive the input character sequence from the device 128 through the Internet 120. The input character sequence may be stored in memory of a computer system that is running or hosting the ecommerce site 102, such as the computer system 700 described below and in FIG. 7.

The input character sequence contains string characters. In some embodiments, the character sequence represents characters input into the device 128, such as through a user interface. For example, text can be input into an ecommerce site 102 on a device 128. The ecommerce site 102 may have an interface for creating a listing for an FSO 124.

In 220, the item name suggestion module 106 identifies a subset of item characteristics that match the input character sequence. In some embodiments, step 220 makes use of known techniques, such as predictive text or autocompletion. Those skilled in the art will understand that such techniques are used in a variety of applications, such as text messaging or internet search engines. Step 220 may differ from known approaches for text prediction in that the dictionary of item characteristics from which the subset of item characteristics are identified is limited to the item characteristics in the hierarchical database 112.

For example, if the input character sequence was the letters "sta," one match for a predictive text or autocomplete algorithm might be the word "star." However, if no item characteristic in the hierarchical database included the word or letter combination of "star," step 220 would not identify "star," or any compound thereof, as an item characteristic, because it is not in the hierarchical database 112. Instead, step 220 identifies the closest entries in the hierarchical database 112.

In some embodiments, the input character sequence received at step 210 corresponds to more than one item characteristic. For example, at step 220, the subset of item characteristics may include characters item characteristics representing different item characteristics that describe the same FSO 124, such as a brand and a model.

Embodiments of item characteristics depend upon the FSO 124 that they describe. Item characteristics may also depend on the type of identifiers, such as metadata tags, used within an ecommerce site 102 to easily identify items.

In some embodiments, item characteristics can include an FSO category, an FSO type, a manufacturer of an FSO, an FSO model name or number, an FSO color, and FSO-specific characteristics. A non-exhaustive list of FSO categories may include mobile devices, personal electronics, shoes, clothes, accessories, bags, or toys. A non-exhaustive list of manufacturers may include Apple, Microsoft, Sony, Samsung, Nike, Nintendo, or Louis Vuitton. Characteristics such as FSO model name or number, FSO color, and FSO-specific characteristics will be understood to vary depending on the specific FSO 124.

Consider an example where the FSO 124 is a smart phone. In some embodiments, an item category for a smart phone can be mobile devices, personal electronics, or smart phones. The FSO type may be smart phone. The manufacturer may be Apple, Samsung, or Motorola. The FSO model may be iphone, iphone 11, or iphone 11 pro. The FSO color may be white, green, red, or black. For a smart phone, FSO-specific characteristics may be optional features or features that vary within an FSO model. For example, an iphone may be offered with varying storage capacities, and an FSO-specific characteristic may be the different storage capacities, such as 64 GB, 128 GB, and 256 GB.

It will be understood that different FSOs 124 can have unrelated item-specific characteristics. For example, clothes can have item characteristics specifying a pattern on the clothing or a clothing size, which may not necessarily relate to specific characteristics of the smart phones described in the examples above.

The above descriptions of item characteristics are not considered exhaustive and are only exemplary. For a given item, the item characteristics included in the hierarchical database 112 may include more item characteristics than the examples listed. The item characteristics may not include the examples listed, but instead include other item characteristics.

In some embodiments, item characteristics are associated with other item characteristics that describe an FSO 124, which together describe the FSO 124. The hierarchical database 112 may include connections between such item characteristics. For example, if an iphone 11 Pro is an FSO 124 in the hierarchical database 112, there is a specific set of item characteristics that correspond to the iphone 11 Pro. The item characteristics which are connected for an iphone 11 Pro may include an FSO manufacturer of Apple, an FSO type of smartphone, an FSO model of iphone 11 Pro, and various FSO colors and FSO-specific characteristics appropriate to iphone 11 Pros.

The hierarchical database 112 does not include connections between characteristics of other FSOs 124 that do not relate to a specific FSO 124. For example, if a shirt and an iphone are FSOs 124 in the hierarchical database 112, and the shirt has an FSO color of fuchsia, but there is no iphone offered in fuchsia, the hierarchical database 112 does not have a link or connection between the FSO color fuchsia and the iphone.

In 230, the item name suggestion module 106 selects a group of suggested item characteristics from the subset of item characteristics. This selection may be based on the score of each of the item characteristics. The selection may also be based on a comparison between a threshold and the score for each of the item characteristics. The group of suggested item characteristics may be item characteristics with a score greater than the threshold. The group of suggested item characteristics may be selected such that the group of suggested item characteristics contains a fixed number of item characteristics. For example, the fixed number may be seven and the group of suggested item characteristics may take the seven item characteristics with the highest score.

The scores in the hierarchical database advantageously allow step 230 to select the most important or highest ranked item characteristics. The group of suggested item characteristics may be ordered based on these scores and the choice of scores can indicate ranking based on a variety of factors. For example, the rankings may be based on the most important or critical item characteristics, such as a category or brand being critical, as opposed to item characteristics such as color, which may not be critical. The rankings may be based popularity of an FSO 124 compared to other FSOs 124. The rankings may be based on the popularity of a particular FSO feature described by an item characteristic of an FSO 124, such as an amount of storage space or a color. The rankings may be based on which item characteristics help minimize the remaining connected item characteristics in the hierarchical database 112. The rankings may be based relationships between FSOs 124, such as FSO accessories versus the FSOs that use the FSO accessories. Varying factors may be used to determine the rankings upon which the scores are based. Further discussion of the scores and ranking relationships are described above and below in the description of the other figures.

In 240, item name suggestion module 106 provides the group of suggested item characteristics to a device 128. Providing the group of suggested item characteristics may include providing metadata tags, associated item characteristics, or the scores of the group of suggested item characteristics. Providing the group of suggested item characteristics to the device 128 may include providing instructions for how to display the group of suggested item characteristics on the device 128. For example, the instructions may specify displaying the group of suggested item characteristics by score from highest to lowest. Providing the group of suggested item characteristics to the device 128 may require transmitting or sending the group of suggested item characteristics to the device 128, such as through a network, a wireless connection, or through the Internet 120.

In 250, item name suggestion module 106 checks whether a seller selection from the group of suggested item characteristics has been received from the device 128. If a seller selection has not been received, but instead additional characters for the character sequence have been received, the method 200 returns to step 210 to receive the additional characters and update the character sequence. The method 200 then continues through the steps as described above, performing steps 220, 230, and 240 on the updated character sequence.

It should be understood that, as characters are received at the device and are received at step 210, the method dynamically updates the provided group of suggested item characteristics. For example, a single character will generate a result, and as additional characters are provided, the provided subset of item characteristics may be updated to reflect the additional information. Those skilled in the art will recognize that this allows a seller accessing the ecommerce site 102 to input text until an option matching an intended FSO 124 is provided, which the seller can then select.

Once item name suggestion module 106 receives a seller selection from the group of suggested item characteristics at step 250, the method 200 then proceeds to step 260.

In 260, item name suggestion module 106 sends instructions to the device 128 to update a user interface based on the received seller selection from step 250. The instructions may be configured to update a text input field to replace or complete the input character sequence with the selected item characteristic. The instructions may be configured to update a description of an FSO 124 with the selected item characteristic. The instructions may be configured to update the description with associated item characteristics. The instructions may be configured to update metadata tags inputs with metadata tags associated with the selected item characteristic.

In some embodiments, the user interface includes required fields as part of an item listing form. The instructions provided by item name suggestion module 106 may be configured to update the field(s) corresponding to the selected item characteristic. The instructions may also be configured to update more than one field based on the selected item characteristic and associated item characteristics. The instructions may be configured to reorder fields in the user interface to put completed fields at the bottom of the user interface and to move empty fields towards the top.

In some embodiments, the process or method of performing steps 210, 220, 230, 240, 250, and 260 can be repeated as new character sequences are added to the text input field to supplement the updated or completed input character sequence based on each new selected item characteristic.

In 270, item name suggestion module 106 verifies if the item listing is complete. A variety of techniques known in the art may be used for this, such as a verifying a checksum, checking if the fields are filled in, or other techniques. In some embodiments, step 270 queries a user whether the item listing has been completed and determines or verifies that the item listing is complete when the user indicates in the affirmative. In some embodiments, the item listing is considered complete when a user hits a proceed or submit button. If the item listing is not complete, the method 200 returns to step 210 and waits to receive further character sequences. If the item listing is complete, method 200 proceeds to step 280.

In 280, item name suggestion module 106 provides instructions to the device 128 to query a seller 122 to verify if the item listing is complete.

In 290, if the seller 122 does not verify that the item listing is complete, the method 200 proceeds to step 295. The seller 122 may verify that the item listing is not complete by indicating a field in the item listing that the seller 122 wants to change or correct.

In 295, item name suggestion module 106 sends instructions to the device 128 to update the user interface based on an input from the device. In some embodiments, the input may a selection by the user of an item listing field that the user wants to change. Updating the user interface based on this input may involve removing text from the item description or the text box related to the item listing field to be changed. Updating the user interface based on the input may involve moving the item listing field to be changed to the top of the list of fields.

Method 200 then returns to step 210 to receive a character sequence and proceed through the various method steps as needed to update the item listing field to be changed.

If the input is that the item listing has been verified, the method 200 proceeds to step 299.

In 299, item name suggestion module 106 completes method 200. In some embodiments, listing generation module 104 then takes over to perform any other steps. Listing generation module 104 may store the item listing in the listing database 108.

Figure 3:
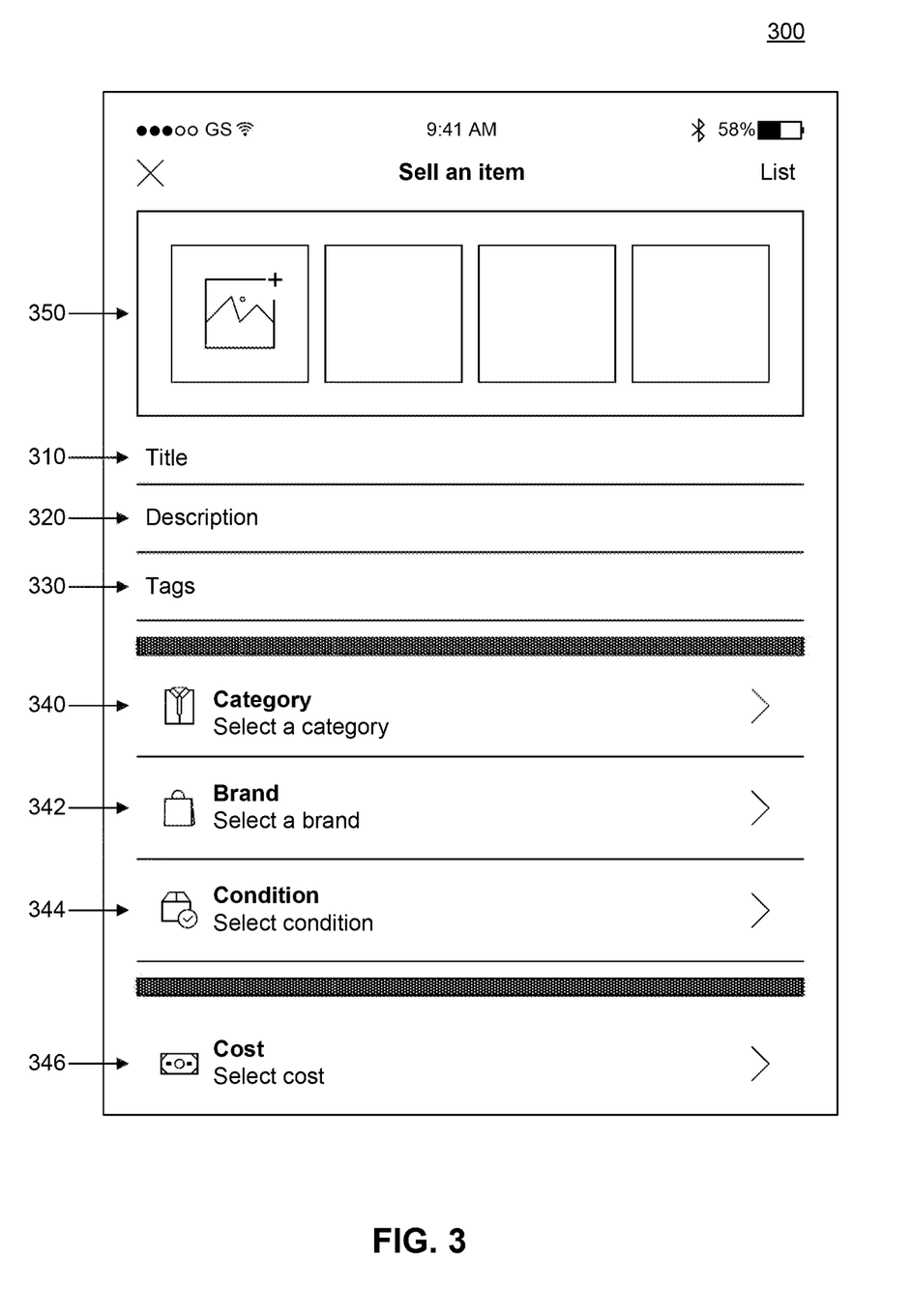
FIG. 3 illustrates an example user interface screen, according to some embodiments.

FIG. 3 shows an example of a user interface 300. FIG. 3 is only exemplary and should not be seen as limiting on the configuration and appearance of the user interface 300. In some embodiments, user interface 300 is part of an ecommerce site 102 accessed by a device 128. User interface 300 may be part of an item listing creation interface for listing FSOs in an online merchandise platform, such as ecommerce site 102. User interface 300 may be accessed through a mobile device.

User interface 300 has a title input 310, description input 320, metadata input 330, item characteristic fields 340, 342, 344, and 346, and picture inputs 350. Some embodiments of user interface 300 may have different inputs and fields.

In some embodiments, title input 310 is a text input for receiving input from a seller 122. For example, a seller may select title input 310 and input characters to form an input character sequence to be received at step 210 of method 200. Title input 310 may be updated by instructions received from item name suggestion module 106 as described in method 200 above. Title input 310 may contain the title of an FSO in an item listing.

In some embodiments, description input 320 contains a description of an FSO in an item listing. Description input 320 may receive text input from a seller 122 using a device 128. Description input 320 may be updated by instructions received from item name suggestion module 106, as described in method 200 above.

In some embodiments, metadata input 330 is a text input for receiving input from a seller 122. Metadata input may contain metadata tags that correspond to an FSO 124. Metadata input 330 may be updated by instructions received from the item name suggestion module 106 as described above in method 200.

In some embodiments, user interface 300 includes fields, such as item characteristic fields 340, 342, 344, and 346. FIG. 3 depicts, as examples, item characteristic fields 340 being an FSO category, item characteristic field 342 being an FSO brand, item characteristic field 344 being an FSO condition, and item characteristic field 346 being an FSO cost. User interface 300 may have more fields or item characteristic fields than those depicted in FIG. 3. Item characteristic fields 340, 342, 344, and 346 may be any item characteristic that can be used to describe an FSO 124. For example, item characteristics can include category, brand, condition, shipping, cost, color, model, and FSO-specific features. Example FSO-specific features may include, non-exhaustively, patterns, storage capacities, sizes, and accessories. Item characteristics may also include characteristics specific to selling FSOs 124 on an ecommerce site 102, such as bidding limits, buy-now prices, and guaranteed sale features.

In some embodiments, item characteristic fields 340, 342, 344, and 346 can each be selected by a seller 122 to input the specific item characteristic. The text input to a specific item characteristic field 340, 342, 344, and 346 may be the input character sequence and may be sent to the item name suggestion module 106 to be received at step 210.

In some embodiments, picture inputs 350 allow a seller 122 to input or attach pictures of an FSO 124 to an item listing.

In some embodiments, user interface 300 is configured to display a list of a group of suggested item characteristics identified in method 200. The seller 122 may select an item characteristic from the displayed list. The displayed list may be configured so that the rest of the screen is not obscured and the seller 122 may see the complete set of options without scrolling. For example, when inputting a title into title input 310 or when inputting into a field, such as item characteristic field 340, the displayed list may appear proximate to the title input 310 or item characteristic field 340 to indicate that the list corresponds to that element, but will not obscure the element or text already entered or displayed there.

Figure 4:
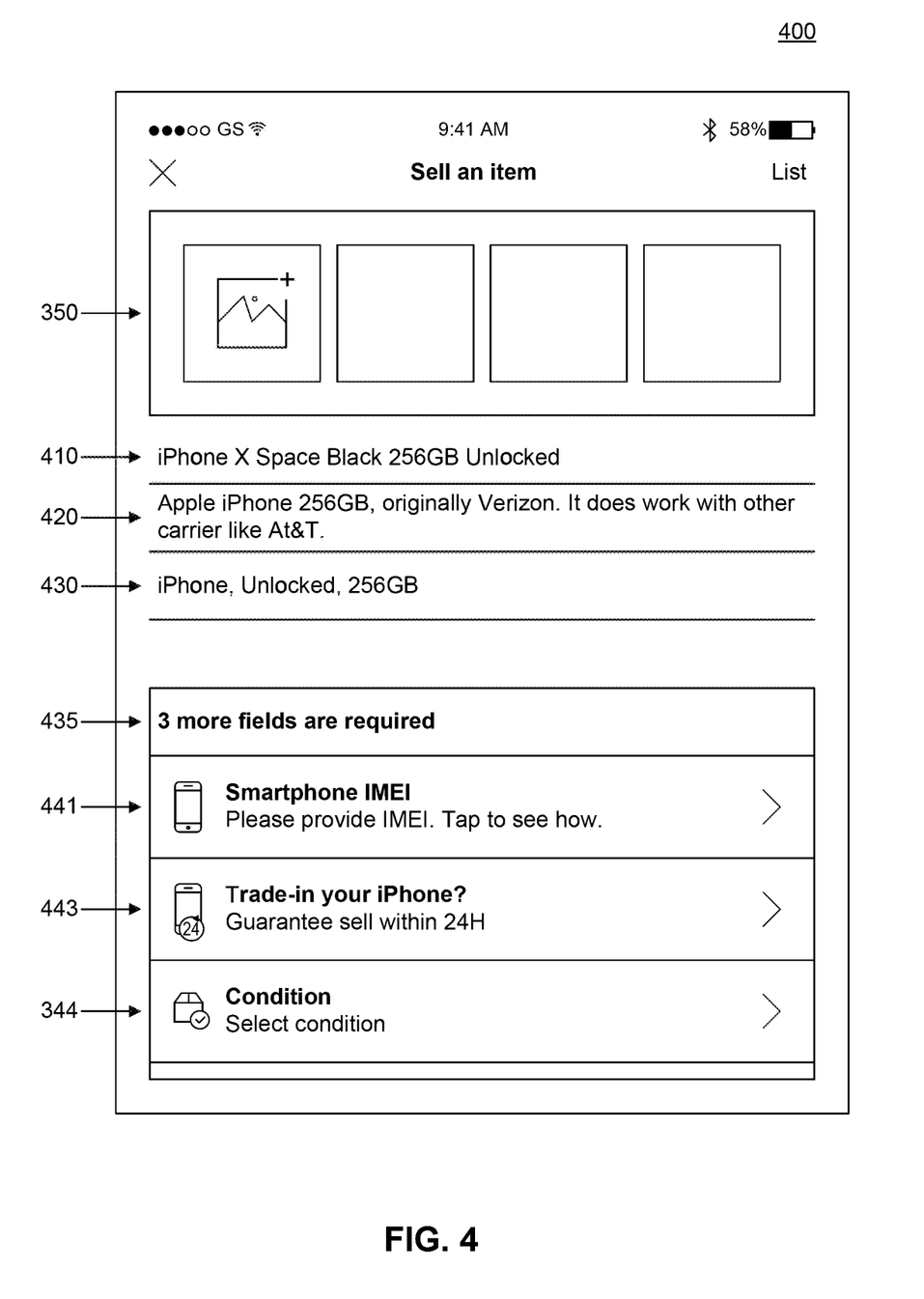
FIG. 4 illustrates an example partially completed item listing screen that has been updated based on user input, according to some embodiments.

FIG. 4 shows an example of a partially completed item listing 400. The partially completed item listing 400 is also an example of a partially completed user interface 300 from FIG. 3. Partially completed item listing 400 has partially completed title input 410, partially completed description input 420, partially completed metadata input 430, completeness indicator 435, incomplete item characteristic fields 344, 441, and 443, and picture inputs 350.

Partially completed title input 410 contains text of a title based on previous inputs. For example, a seller 122 may have input at least part of the word "iphone" and method 200 identified iphone X as one of the options, which the seller 122 then selected and which was then updated to the title by method 200. In some embodiments, the additional words of "Space Black 256 GB Unlocked" were each at least partially input by the seller 122 and identified by method 200. Some of the words in the partially completed title input 410 may be associated with an item characteristic that matched the character sequence received at step 210 and were added based on a seller selection of that item characteristic.

In some embodiments, partially completed description input 420 contains text input by a seller 122. This text may be generated by method 200 as described above. In the example shown in FIG. 4, this text is manually input by the seller 122 to describe the FSO 124.

In some embodiments, partially completed metadata input 430 contains metadata tags associated with item characteristics identified by method 200 as described above.

In some embodiments, completeness indicator 435 indicates the number of fields remaining to be completed in the partially completed item listing 400. For example, as shown in FIG. 4, three more fields are required and three fields, item characteristic fields 344, 441, and 443 are shown incomplete. The incomplete fields may be shifted to the top of the list, as described above in method 200.

Item characteristic fields 441 and 443 may be like the item characteristic fields 340, 342, 344, and 346 described above in FIG. 3.

In some embodiments, the partially completed item listing 400 is completed by method 200. For example, a seller 122 can enter "iph" into the title of user interface 300, and the device 128 sends the character sequence to the item name suggestion module 106, which begins to execute the method 200. One of the item characteristics identified may be "iphone X" and this item characteristic may be in the group of suggested item characteristics. Method 200 provides the group of suggested item characteristics back to the user interface 300, which may display list of the group of suggested item characteristics on the user interface 300. This displayed list may be below the title input 310 and may include, for example, "iphone X" as an option. In Method 200 may also provide the metadata tag "iphone." The seller 122 may also see this metadata tag and that it is associated with the title element "iphone X."

Upon selection of "iphone X" by the user, method 200 may receive the input and send instructions to the user interface 300 to update the title input 310 to replace "iph" with "iphone x" and to add the metadata tag "iphone" to the metadata input 330, as shown in FIG. 4. Further, one of the fields below, such as a model type, not shown, but similar to item characteristic fields 340, 342, 344, and 346, may update to indicate that the model was "iphone X." The item characteristic field 340 for category may update to indicate a category of smartphone and the item characteristic field 342 for brand may update to indicate a brand of "Apple." The completed fields may shift to the bottom of the listing and incomplete fields may shift to the top. For example, the new topmost field may be item characteristic field 441, as shown in FIG. 4. Additional input may then be added, either to the partially completed title input 410 or to one of the fields such as item characteristic field 441, 443, and 344.

Figure 5:
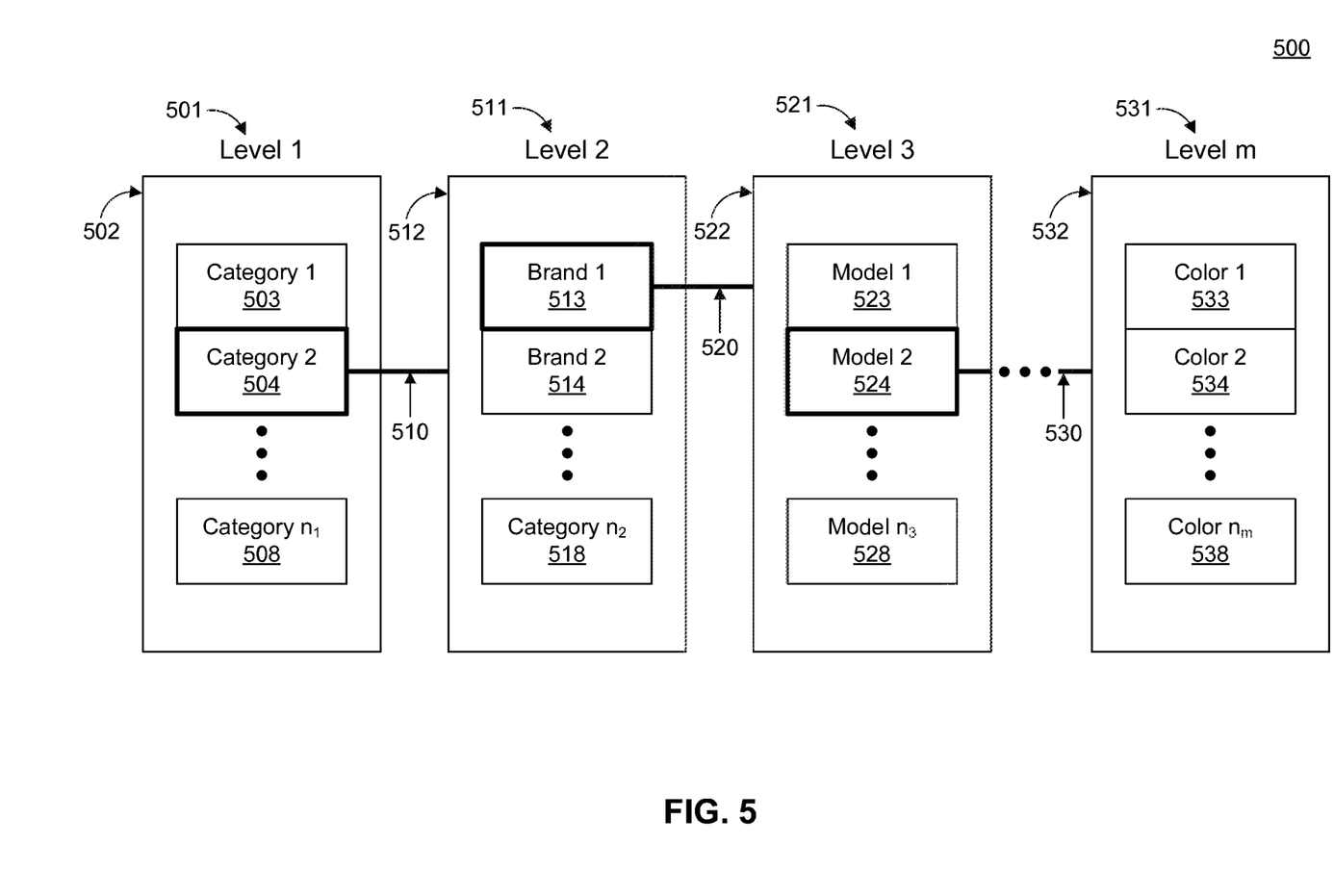
FIG. 5 illustrates a subset of a hierarchical database or tree structure with various levels of item characteristic abstractions, according to some embodiments.

FIG. 5 illustrates a subset hierarchical database 500, an example of a portion of a hierarchical database 112 used in method 200. The hierarchical database 112 contains descriptions of FSOs based on various item characteristics that can be different for each FSO, as discussed above. In some embodiments, some item characteristics for similar FSOs 124, such as storage capacity for different smart phones, and some item characteristics that are similar for different FSOs 124, such as color of FSOs 124, can be sorted into common groups. Further, item characteristics have connections based on the FSOs that they describe which connect the different common groups.

FIG. 5 is a subset of a hierarchical database 112 that shows one embodiment of how the subset hierarchical database 500 can be visualized. Those skilled in the art will understand that a visualization of a database, such as subset hierarchical database 500, may reflect how data is actually stored. Other data structures may be used to preserve the relationships depicted in the visualization without using the structure depicted in the visualization.

The hierarchical database 112 is hierarchical in the sense that different item characteristics may be sorted in m different levels, such as level 1 501, level 2 511, level 3 521, and so on, to level m 531, as depicted in FIG. 5. Each item characteristic may be associated with a score that reflects a ranking of that item characteristic. The score may reflect a ranking based on a common group to which the item characteristic belongs. The score may reflect a ranking based on the item characteristic itself in relation to the other item characteristics. The score may reflect a ranking based on the common group to which the item characteristic belongs as well as the relation of the item characteristic to other item characteristics. The ranking upon which the score is based may be based upon predetermined criteria.

FIG. 5 visually depicts the ranking by the sorting of the levels. In some embodiments, within each level are common groups, such as common group 502 in level 1 501, common group 512 in level 2 511, common group 522 in level 3 521, and common group 532 in level m 531. Exampled of common groups are shown, with common group 502 containing the item characteristic of category, common group 512 containing the item characteristic of brand, common group 522 containing the item characteristic of model, and common group 532 containing the item characteristic of color. Example contents of the common groups are $n_1$ categories such as category 1 503, category 2 504, and so on to category $n_1$ 508, $n_2$ brands such as brand 1 513, brand 2 514, and so on to brand $n_2$ 518, $n_3$ models such as model 1 523, model 2 524, and so on to model $n_3$ 528, and $n_m$ colors such as color 1 533, color 2 534, and so on to color $n_m$ 538. The categories can be, for example, smart phone accessories for category 1 503, smart phones for category 2 504, and clothing for category $n_1$ 508. The specifics of the common groups and the contents of each common group will vary with the specific FSOs 124 being described by the item characteristics in the hierarchical database 112.

FIG. 5 further depicts connections between item characteristics in each level based on the sets of item characteristics that describe a specific FSO 124. For example, category 2 504, highlighted in black bolded lines, is connected to the level 2 511 common group 512 by connection 510, indicating that the contents of common group 512 are brands which correspond to category 2 504. Similarly, brand 1 513 is highlighted and connected to common group 522 at level 3 521 by connection 520, indicating that the contents of common group 522 are models which correspond both to brand 1 513 and category 2 504. Model 2 524 is highlighted at level 3 521 and the connections continue, until connection 530 connects common group 532 at level m 531, where the contents are colors that correspond to FSOs with item characteristics of category 2 504, brand 1 513, and model 2 524. For example, if category 2 504 is smart phones, brand 1 513 can be Apple, a manufacturer of smart phones. Model 2 524 can be an iphone X, one of the smart phones manufactured by Apple. The colors in common group 532 would then be colors that iphone Xs are available in.

As previously discussed above, each item characteristic, such as category 1 503, has a score associated with it. In some embodiments, at least some item characteristics also have metadata tag(s) associated with the item characteristic. For example, a metadata tag of smartphone may be associated with category 2 504 when category 2 504 is smart phones. Some item characteristics may not have a metadata tag associated with them. For example, if color 1 533 is black, there may not be a metadata tag for the color black.

Figure 6:
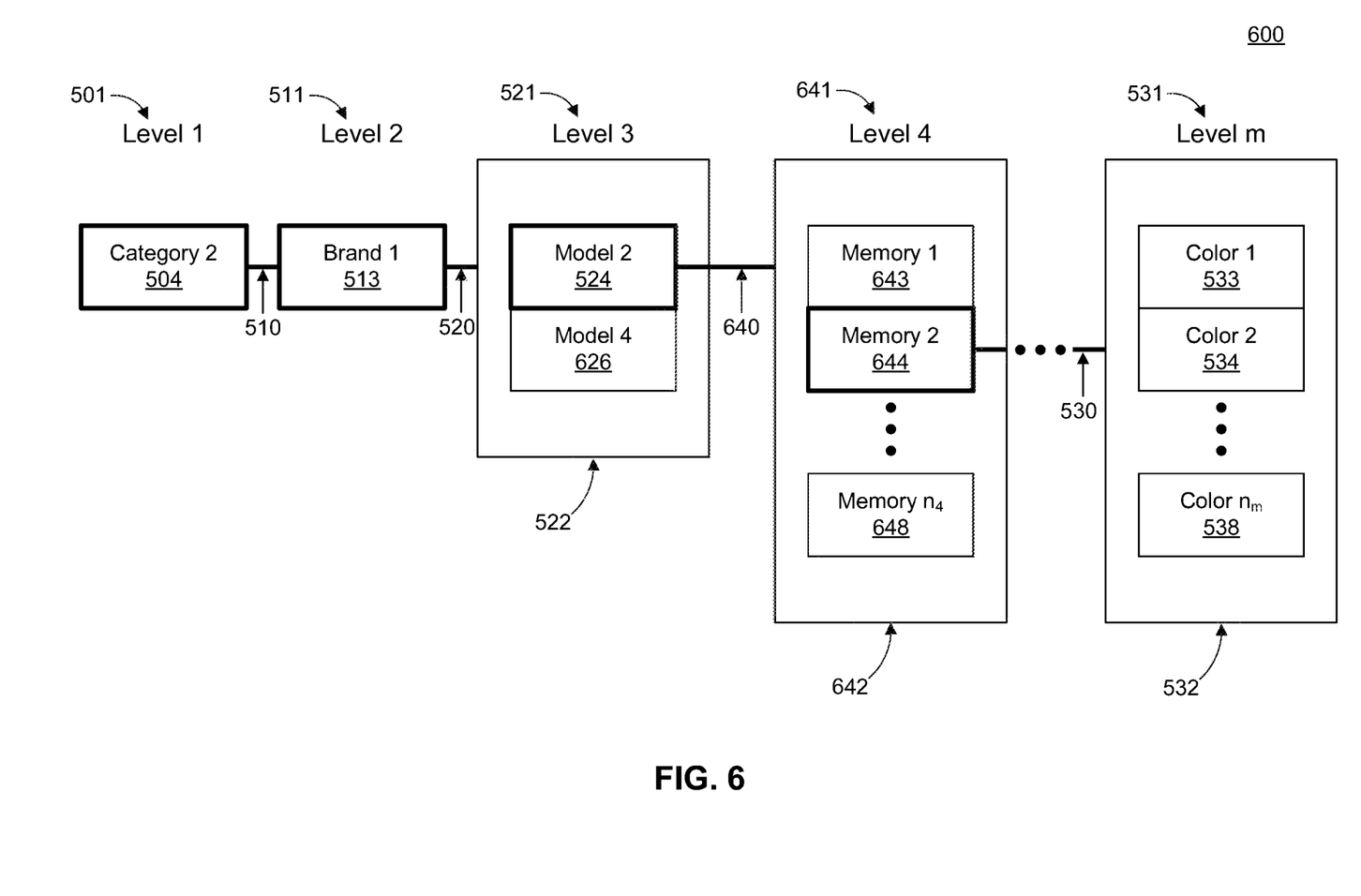
FIG. 6 illustrates an example selected item characteristics in a subset of a hierarchical tree structure or database, according to some embodiments.

FIG. 6 illustrates a partially selected subset hierarchical database 600, an example of an embodiment of a portion of a hierarchical database 112 used in method 200. This partially selected subset hierarchical database 600 depicts an example of a subset of the hierarchical database 112 where several item characteristics were selected by a seller 122, limiting the relevant common groups and connections.

At level 1 501, category 2 504 has been selected and is connected at level 2 511 to brand 1 513, which was also selected, by connection 510. Brand 1 513 is connected to common group 522 at level 3 521 by connection 520. Common group 522 is reduced to two models—model 2 524 and model 4 626. In this example, these two models are the only two that correspond to items with category 2 504 and brand 1 513.

Similar to FIG. 5, the remainder of the partially selected subset set hierarchical database 600 shows possible connections to other highlighted item characteristics. Model 2 524 is highlighted and connects by connection 640 to level 4 641 containing common group 642. Common group 642 contains item characteristics for memory, including memory 1 643, memory 2 644, up to memory $n_4$ 648. Memory 2 644 is further connected to other common groups, ending with level m 531, as described in more detail for FIG. 5 above.

In some embodiments, partially selected subset hierarchical database 600 is an example of a subset of the hierarchical database that method 200 searches based on a seller 122 input sequence received at step 210 at an intermediate step in an iterative application of method 200. Based on the previously selected category 2 504 and brand 1 513, as discussed above, the item characteristics which are searched to match the seller 122 input character sequence at step 220 are limited. Step 220 may be configured to only search only a part of a hierarchical database 112, such as partially selected subset hierarchical database 600.

Rules Determining Scores

In some embodiments, the score for each item characteristic is determined in part by rules relating the scores or FSOs 124 to each other. The rules may be based in part on a ranking of an item characteristic. More than one rule may be used to determine the scores of the item characteristics and the scores satisfy each of the rules. The scores of item characteristics may be configured based on rules that compare combinations of the scores of multiple item characteristics. Rules other than the example rules included below may be used to determine the scores.

In some embodiments, the scoring being governed by various rules allows method 200 to sort results and select the group of suggested item characteristics to include and suggest the most importantly ranked item characteristics. This advantageously allows method 200 to parse different item characteristics by importance even when the text input by a seller 122 cannot differentiate them alone and there is no other indicator of importance or ranking. This also advantageously allows a seller 122 using an ecommerce site 102 that employs method 200 to receive the most important suggestions to allow for simpler completion of an item listing. The importance or ranking of item characteristics may be combined with the rules that govern the scores such that the most important selection will eliminate other options from the hierarchical tree. This may reduce or eliminate remaining choices such that future searching is minimized. This advantageously allows method 200 to minimize the amount of processing needed at future steps in the method, as the number of item characteristics to parse may be minimized at each iteration.

In some embodiments, a rule is that an item characteristic with a higher ranking has a higher score than item characteristics with lower rankings. For example, for any item characteristic in a common group at level 1 501, such as common group 502, the score for those item characteristics will be higher than any individual score for any other item characteristic at any lower level, such as level 2 511. Under this rule, ranking may establish the importance of a particular item characteristic in identifying an FSO 124. For example, a category may be most important in identifying an item, so the item characteristic of category is placed in level 1 501. As a further example, the item characteristic of color may be least important in identifying an item, so the item characteristic of color is placed at level m 531.

Referring back to FIG. 5, as an example of method 200 applying the scoring according to the example subset hierarchical database 500 and using user interface 300, a seller 122 may input into the title input 310 the character sequence "app" which the correspond to the item characteristics brand 1 513, which in this example is the brand "Apple," and color 1 533, which in this example is "green apple" (a color of an FSO 124). Method 200 may identify both of these results as item characteristics. Brand 1 513 is in level 2 511 and, according to the rule above, has a higher score than color 1 533, which is in level m 531. Both brand 1 513 and color 1 533 may be selected as part of the group of suggested item characteristics in step 230. As discussed above, the group of suggested item characteristics may include a fixed number of item characteristics, and if enough other item characteristics matched the character sequence "app," only brand 1 513 may be included in the group of suggested item characteristics.

In some embodiments, when method 200 performs step 240, the scores associated with brand 1 513 and color 1 533 may be provided along with those item characteristics. The user interface 300 may then update to display the item characteristics in order based on the score. Instructions may be provided that sort the item characteristics based on the score. Based on the scores in this example, brand 1 513 would be displayed first.

In some embodiments, a rule is that item characteristics have scores based on a ranking or importance within the ranking levels. For example, the scores for common group 522 may be ranked amongst the models themselves. Model 1 523 may be ranked higher than model 2 524 and will correspondingly have a higher score. This ranking within item characteristics may be based on popularity of a specific item characteristic. For example, model 1 523 can be more popular than model 2 524. This ranking may be based on when an FSO 124 with the item characteristic was released or first introduced to the public. For example, if model 1 523 is iphone X and model 2 524 is iphone 3, because iphone 3 was released first, it would have a lower ranking than iphone X.

In some embodiments, a rule configures scores such that scores of two or more item characteristics from a lower level, such as level 2 511 are, in combination, greater than a score of a single item characteristic from a higher level, such as level 1 501.

In some embodiments, a rule configures scores such that scores of a first item characteristic at a first level, such as level 1 501, when combined with other item characteristics at lower levels, such as level 2 511, level 3 521, level 4 641, or level m 531, are higher than a score of a second item characteristic at the first level.

Example Computer System

Figure 7:
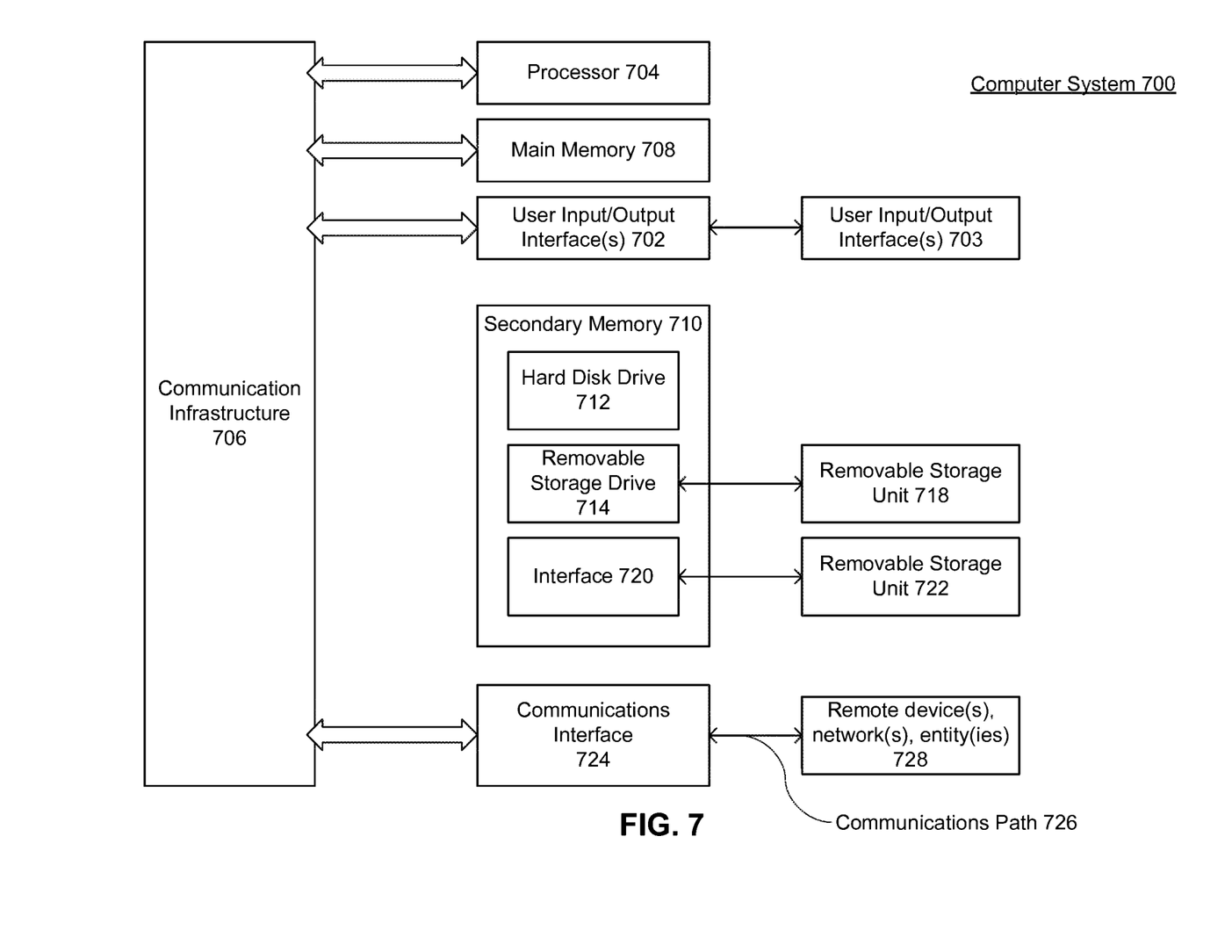
FIG. 7 illustrates a block diagram of a general-purpose computer that may be used to perform various aspects of the present disclosure, according to some embodiments.

Embodiments may be implemented, for example, using one or more computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a bus or communication infrastructure 706.

Computer system 700 may also include user input/output device(s) 703, such as monitors, keyboards, pointing devices, touch screens, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, vector processing, array processing, etc., as well as cryptography (including brute-force cracking), generating cryptographic hashes or hash sequences, solving partial hash-inversion problems, and/or producing results of other proof-of-work computations for some blockchain-based applications, for example. With capabilities of general-purpose computing on graphics processing units (GPGPU), the GPU may be particularly useful in at least the image recognition and machine learning aspects described herein, such as predictive texting or autocomplete techniques.

Additionally, one or more of processors 704 may include a coprocessor or other implementation of logic for accelerating cryptographic calculations or other specialized mathematical functions, including hardware-accelerated cryptographic coprocessors. Such accelerated processors may further include instruction set(s) for acceleration using coprocessors and/or other logic to facilitate such acceleration.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or secondary memory 710. Secondary memory 710 may include, for example, a main storage drive 712 and/or a removable storage device or drive 714. Main storage drive 712 may be a hard disk drive or solid-state drive, for example. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communication path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet of Things (IoT), and/or embedded system, to name a few non-limiting examples, or any combination thereof.

In some embodiments, computer system 700 may be a server or hosting device that hosts a web site or web application, and communication or network interface 724 allows other devices, such as a device or mobile device to access the web site or web application. In some embodiments, a first computer system 700 is a server that receives input from a second computer system 700, such as a mobile device, which a user entered into the second computer system 700, while the first computer system 700 performs the method 200.

In some embodiments, a computer process product or memory contains instructions configured to implement an embodiment of method 200 and is downloaded to a device 128 or mobile device, such as a computer system 700. The instructions can cause computer system 700 to present a user interface 300 for an ecommerce site 102 on the display as part of user input/output device(s) 703. The instructions may be stored on the various memory available in computer system 700, such as main memory 708 or secondary memory 710. The instructions may be configured to cause processor 704 to execute method 200.

It should be appreciated that the framework described herein may be implemented as a method, process, apparatus, system, or article of manufacture such as a non-transitory computer-readable medium or device. For illustration purposes, the present framework may be described in the context of distributed ledgers being publicly available, or at least available to untrusted third parties. One example as a modern use case is with blockchain-based systems. It should be appreciated, however, that the present framework may also be applied in other settings where sensitive or confidential information may need to pass by or through hands of untrusted third parties, and that this technology is in no way limited to distributed ledgers or blockchain uses.

Computer system 700 may be a client or server, accessing or hosting any applications and/or data through any delivery paradigm, including but not limited to remote or distributed cloud computing solutions; local or on-premises software (e.g., "on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), database as a service (DBaaS), etc.); and/or a hybrid model including any combination of the foregoing examples or other services or delivery paradigms.

Any applicable data structures, file formats, and schemas may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

Any pertinent data, files, and/or databases may be stored, retrieved, accessed, and/or transmitted in human-readable formats such as numeric, textual, graphic, or multimedia formats, further including various types of markup language, among other possible formats. Alternatively or in combination with the above formats, the data, files, and/or databases may be stored, retrieved, accessed, and/or transmitted in binary, encoded, compressed, and/or encrypted formats, or any other machine-readable formats.

Interfacing or interconnection among various systems and layers may employ any number of mechanisms, such as any number of protocols, programmatic frameworks, floorplans, or application programming interfaces (API), including but not limited to Document Object Model (DOM), Discovery Service (DS), NSUserDefaults, Web Services Description Language (WSDL), Message Exchange Pattern (MEP), Web Distributed Data Exchange (WDDX), Web Hypertext Application Technology Working Group (WHATWG) HTML5 Web Messaging, Representational State Transfer (REST or RESTful web services), Extensible User Interface Protocol (XUP), Simple Object Access Protocol (SOAP), XML Schema Definition (XSD), XML Remote Procedure Call (XML-RPC), or any other mechanisms, open or proprietary, that may achieve similar functionality and results.

Such interfacing or interconnection may also make use of uniform resource identifiers (URI), which may further include uniform resource locators (URL) or uniform resource names (URN). Other forms of uniform and/or unique identifiers, locators, or names may be used, either exclusively or in combination with forms such as those set forth above.

Any of the above protocols or APIs may interface with or be implemented in any programming language, procedural, functional, or object-oriented, and may be compiled or interpreted. Non-limiting examples include C, C++, C#, Objective-C, Java, Scala, Clojure, Elixir, Swift, Go, Perl, PHP, Python, Ruby, JavaScript, WebAssembly, or virtually any other language, with any other libraries or schemas, in any kind of framework, runtime environment, virtual machine, interpreter, stack, engine, or similar mechanism, including but not limited to Node.js, V8, Knockout, jQuery, Dojo, Dijit, OpenUI5, AngularJS, Express.js, Backbone.js, Ember.js, DHTMLX, Vue, React, Electron, and so on, among many other non-limiting examples.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different from those described herein.

References herein to "one embodiment," "an embodiment," "an example embodiment," "some embodiments," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents

What is claimed is:

1. A computer-implemented method for identifying For Sale Object (FSO) sale information based on seller input, the method comprising:

receiving, at an item name suggestion module, a character sequence comprising at least one character;

identifying, by the item name suggestion module and using a hierarchical database, a subset of item characteristics of a plurality of item characteristics based on the character sequence, wherein each item characteristic of the plurality of item characteristics comprises a string, wherein each item characteristic of the subset of item characteristics is associated with at least one other item characteristic of the subset of item characteristics using a link within the hierarchical database, wherein each item characteristic is associated with a score, and wherein the score describes a ranking of the each item characteristic relative to each other item characteristic of the plurality of item characteristics;

sorting, by the item name suggestion module, the ranking of each item characteristic;

selecting, by the item name suggestion module, one or more most important or highest ranked item characteristics from the subset of item characteristics based on a comparison of the score for each item characteristic of the subset of item characteristics and based on a limit on a number of the one or more item characteristics;

providing, from the item name suggestion module, the one or more most important or highest ranked item characteristics to a device, wherein the limit is associated with a characteristic of a display of the device;

displaying, by the item name suggestion module, the one or more most important or highest ranked item characteristics to the device based on an importance or the ranking of each item characteristic; and when the one or more most important or highest ranked item characteristics displayed on the device are not selected by a user:

removing, from a hierarchical tree of the hierarchical database, one or more item characteristics from the plurality of item characteristics based on the most important or highest ranked of each item characteristic such that next identifying item characteristics is minimized;

after the removing, in response to receiving an additional input of the character sequence, iterating the receiving, the identifying, the sorting, the selecting, the providing and the displaying until receiving a selection of the one or more item characteristics displayed to the device;

receiving, from the device, at the item name suggestion module, a selected item characteristic from the one or more most important or highest ranked item characteristics;

providing, by the item name suggestion module, instructions for updating a user interface on the device based on the selected item characteristic; and verifying and storing an item listing when the item listing is complete.

2. The method of claim 1, wherein identifying the subset of item characteristics based on the character sequence comprises:

predicting, by the item name suggestion module, a first one or more strings based on the character sequence; and identifying the subset of item characteristics comprising a second one or more strings that match the first one or more strings.

3. The method of claim 1, wherein a first set of item characteristics of the plurality of item characteristics comprises item characteristics that are each associated with at least one metadata tag and wherein providing the one or more item characteristics to the device further comprises providing a metadata tag for each of the one or more item characteristics that is part of the first set of item characteristics.

4. The method of claim 1, wherein the plurality of item characteristics comprises strings that describe item characteristics chosen from one or more of:

an item type, an item manufacturer, an item model, an item color, and an item storage capacity.

5. The method of claim 1, wherein the score for each item characteristic is based on one or more rules that relate the ranking of each item characteristic to each other item characteristic.

6. The method of claim 5, the one or more rules comprising a rule that, for a first item characteristic having a higher ranking than a second item characteristic, a first score of the first item characteristic is higher than a second score of the second item characteristic.

7. The method of claim 5, wherein:

identifying the subset of item characteristics from the plurality of item characteristics is further based on the selected item characteristic; and selecting the one or more most important or highest ranked item characteristics from the subset of item characteristics is further based on each score of the selected item characteristic.

8. The method of claim 7, wherein:
identifying the subset of item characteristics is based on the character sequence; and
the selected item characteristic further comprise:
  predicting a first one or more strings based on the character sequence; and
  identifying the subset of item characteristics which match the first one or more strings and which are associated with the selected item characteristic.

9. The method of claim 7, the one or more rules comprising a rule that, for a first item characteristic and a second item characteristic with a same ranking, and a third characteristic with a lower ranking than the first item characteristic and the second item characteristic, a first score of the first item characteristic plus a third score of the third item characteristic is higher than a second score of the second item characteristic.

10. The method of claim 7, the one or more rules comprising a rule that, for a first item characteristic with a higher ranking than each of a first plurality of item characteristics, a sum of each of a plurality of scores of the first plurality of item characteristics is higher than a first score of the first item characteristic.

11. A system for updating a display with For Sale Object (FSO) sale information based on seller input, the system comprising:
one or more processors;
one or more network interfaces communicatively coupled to the one or more processors; and
memory communicatively coupled to the one or more processors and the one or more network interfaces, wherein the memory stores instructions that, when executed, cause the one or more processors to:
  receive a character sequence comprising at least one character;
  identify, using a hierarchical database, a subset of item characteristics of a plurality of item characteristics based on the character sequence, wherein each item characteristic of the plurality of item characteristics comprises a string, wherein each item characteristic of the subset of item characteristics is associated with at least one other item characteristic of the subset of item characteristics using a link within the hierarchical database, wherein each item characteristic is associated with a score, and wherein the score describes a ranking of the each item characteristic relative to each other item characteristic of the plurality of item characteristics;
  sort the ranking of each item characteristic;
  select one or more most important or highest ranked item characteristics from the subset of item characteristics based on a comparison of the score for each item characteristic of the subset of item characteristics and based on a limit on a number of the one or more item characteristics;
  provide to a device the one or more most important or highest ranked item characteristics and display instructions configured to cause a display of the device to update an item listing with the one or more item characteristics as recommended selections, wherein the limit is associated with a characteristic of the display of the device;
  display the one or more most important or highest ranked item characteristics to the device based on an importance or the ranking of each item characteristic; and
  when the one or more most important or highest ranked item characteristics displayed on the device are not selected by a user:
    remove, from a hierarchical tree of the hierarchical database, one or more item characteristics from the plurality of item characteristics based on the most important or highest ranked of each item characteristic such that next identifying item characteristics is minimized;
    after the removing, in response to receiving an additional input of the character sequence, iterate the receiving, the identifying, the sorting, the selecting, the providing and the displaying until receiving a selection of the one or more item characteristics displayed to the device;
  receive, from the device, a selected item characteristic from the one or more most important or highest ranked item characteristics;
  provide instructions for updating a user interface on the device based on the selected item characteristic; and
  verify and store the item listing when the item listing is complete.

12. The system of claim 11, wherein, to identify the subset of item characteristics, the instructions further cause the one or more processors to:
  predict a first one or more strings based on the character sequence; and
  identify the subset of item characteristics comprising a second one or more strings and a first one or more metadata tags that match the first one or more strings.

13. The system of claim 11, wherein the score for each item characteristic is based on one or more rules that relate the ranking of each item characteristic to each other item characteristic.

14. The system of claim 13, wherein the one or more rules comprise a rule that, for a first item characteristic having a higher ranking than a second item characteristic, a first score of the first item characteristic is higher than a second score of the second item characteristic.

15. The system of claim 13, wherein the instructions further cause the one or more processors to:
  identify the subset of item characteristics from the plurality of item characteristics based on the selected item characteristic; and
  select the one or more item characteristics from the subset of item characteristics based on each score of the selected item characteristic.

16. The system of claim 15, wherein, to identify the subset of item characteristics, the instructions further cause the one or more processors to:
  predict a first one or more strings based on the character sequence; and
  identify the subset of item characteristics which match the first one or more strings and which are associated with the selected item characteristic.

17. The system of claim 15, wherein the one or more rules comprise a rule that, for a first item characteristic and a second item characteristic with a same ranking, and a third characteristic with a lower ranking than the first item characteristic and the second item characteristic, a first score of the first item characteristic plus a third score of the third item characteristic is higher than a second score of the second item characteristic.

18. The system of claim 15, wherein the one or more rules comprise a rule that, for a first item characteristic with a higher ranking than each of a first plurality of item characteristics, a sum of each of a plurality of scores of the first plurality of item characteristics is higher than a first score of the first item characteristic.

19. A non-transitory computer readable storage medium having computer readable code thereon, the non-transitory computer readable medium including instructions configured to cause a computer system to perform operations comprising:

receiving a character sequence comprising at least one character;

identifying, and using a hierarchical database, a subset of item characteristics of a plurality of item characteristics based on the character sequence, wherein each item characteristic of the plurality of item characteristics comprises a string, wherein each item characteristic of the subset of item characteristics being associated with at least one other item characteristic of the subset of item characteristics using a link within the hierarchical database, wherein each item characteristic is associated with a score, and the score describing a ranking of the each item characteristic relative to each other item characteristics of the plurality of item characteristics, and wherein a first set of item characteristics from the plurality of item characteristics comprises item characteristics each associated with a metadata tag; sorting the ranking of each item characteristic;

selecting one or more item characteristics from the subset of item characteristics based on a comparison of the score for each item characteristic of the subset of item characteristics and based on a limit on a number of the one or more most important or highest ranked item characteristics;

providing the one or more item characteristics and, for each item characteristic of the one or more most important or highest ranked item characteristics associated with the metadata tag, the metadata tag for the each item characteristic, to a device, wherein the limit is associated with a characteristic of a display of the device;

displaying the one or more item characteristics to the device based on an importance or the ranking of each item characteristic; and when the one or more most important or highest ranked item characteristics displayed on the device are not selected by a user:

removing, from a hierarchical tree of the hierarchical database, one or more item characteristics from the plurality of item characteristics based on the most important or highest ranked of each item characteristic such that next identifying item characteristics is minimized;

after the removing, in response to receiving an additional input of the character sequence, iterating the receiving, the identifying, the sorting, the selecting, the providing and the displaying until receiving a selection of the one or more item characteristics displayed to the device;

receiving, from the device, a selected item characteristic from the one or more most important or highest ranked item characteristics;

providing instructions for updating a user interface on the device based on the selected item characteristic; and verifying and storing an item listing when the item listing is complete.

20. The non-transitory computer readable storage medium of claim 19, wherein identifying the subset of item characteristics based on the character sequence comprises:

predicting a first one or more strings based on the character sequence; and identifying the subset of item characteristics comprising a second one or more strings that match the first one or more strings.

* * * * *